(12) United States Patent
Ueno et al.

(10) Patent No.: US 7,950,160 B2
(45) Date of Patent: May 31, 2011

(54) MOBILE ELECTRONIC APPARATUS AND BEARING DISPLAY METHOD OF SAME

(75) Inventors: Yasuhiro Ueno, Kanagawa (JP); Kazuto Ito, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 239 days.

(21) Appl. No.: 12/162,598

(22) PCT Filed: Jan. 30, 2007

(86) PCT No.: PCT/JP2007/051500
§ 371 (c)(1),
(2), (4) Date: Oct. 29, 2008

(87) PCT Pub. No.: WO2007/086581
PCT Pub. Date: Aug. 2, 2007

(65) Prior Publication Data
US 2009/0300928 A1    Dec. 10, 2009

(30) Foreign Application Priority Data
Jan. 30, 2006    (JP) .................................. 2006-021572

(51) Int. Cl.
*G01C 17/38* (2006.01)
*G06F 19/00* (2011.01)
(52) U.S. Cl. ..................................... 33/356; 33/355 R
(58) Field of Classification Search .................... 33/356, 33/355 R, 355 D, 363 R
See application file for complete search history.

(56) References Cited

U.S. PATENT DOCUMENTS

| 5,872,557 | A | * | 2/1999 | Wiemer et al. | ................. 345/156 |
| 6,132,391 | A | * | 10/2000 | Onari et al. | .................... 600/595 |
| 6,321,158 | B1 | * | 11/2001 | DeLorme et al. | ............. 701/201 |
| 6,466,198 | B1 | * | 10/2002 | Feinstein | ....................... 345/158 |
| 6,946,991 | B2 | * | 9/2005 | Hasebe et al. | ............ 342/357.08 |
| 7,028,410 | B2 | * | 4/2006 | Sato et al. | ........................ 33/356 |

(Continued)

FOREIGN PATENT DOCUMENTS

JP    2000224274 A    8/2000

(Continued)

OTHER PUBLICATIONS

Japanese language office action dated Jul. 13, 2010 and its English language translation for corresponding Japanese application 2007556045 lists the reference above.

English translation of Korean office action dated Sep. 15, 2010 for corresponding Korean application 1020087021243.

*Primary Examiner* — Yaritza Guadalupe-McCall
(74) *Attorney, Agent, or Firm* — DLA Piper LLP (US)

(57) ABSTRACT

A mobile electronic apparatus capable of effectively preventing erroneous recognition of a bearing (azimuth oz compass direction) by a user, as a correct display of the bearing is correct when the reliability of the display of the bearing is lowered by a change of the usage environment, and a bearing display method of the same, are provided. If a mobile electronic apparatus (100) is mounted on a charger (200) having a speaker (201), while information on a bearing calculated according to geomagnetism detected by a geomagnetic sensor (108) is displayed on a display part (107), updating of the information on the bearing repeated up to them is stopped, and information on a predetermined bearing is continuously displayed on the display part (107). This enables a user to correctly recognize that the information on the bearing displayed on the display part (107) is incorrect, thereby preventing the user from being misled by the unreliable information on the display part (107).

11 Claims, 5 Drawing Sheets

U.S. PATENT DOCUMENTS

| | | | |
|---|---|---|---|
| 7,194,816 B2 * | 3/2007 | Tamura | 33/355 R |
| 7,210,236 B2 * | 5/2007 | Sato et al | 33/356 |
| 7,324,906 B2 * | 1/2008 | Sato et al. | 33/356 |
| 7,474,977 B2 * | 1/2009 | Sato et al. | 33/356 |
| 7,606,676 B2 * | 10/2009 | Sato et al. | 33/356 |
| 7,637,024 B2 * | 12/2009 | Amundson et al. | 33/335 R |
| 2002/0014016 A1 * | 2/2002 | Kato | 33/355 R |
| 2003/0083075 A1 * | 5/2003 | Miyazaki et al. | 455/456 |
| 2005/0072011 A1 * | 4/2005 | Miyashita et al. | 33/355 R |
| 2005/0143148 A1 * | 6/2005 | Sato et al. | 455/575.1 |
| 2005/0150122 A1 * | 7/2005 | Cho et al. | 33/356 |
| 2007/0233381 A1 | 10/2007 | Okeya | |
| 2009/0132198 A1 * | 5/2009 | Ito et al. | 33/356 |
| 2009/0221327 A1 * | 9/2009 | Tanaka et al. | 455/557 |
| 2009/0300928 A1 * | 12/2009 | Ueno et al. | 33/356 |
| 2009/0320305 A1 * | 12/2009 | Ito et al. | 33/356 |
| 2010/0136957 A1 * | 6/2010 | Horodezky et al. | 455/414.2 |
| 2010/0177601 A1 * | 7/2010 | Kim et al. | 368/14 |

FOREIGN PATENT DOCUMENTS

| | | |
|---|---|---|
| JP | 2003-289366 | 10/2003 |
| JP | 2004-184150 | 7/2004 |
| JP | 2004-286613 | 10/2004 |
| JP | 2005-107323 | 4/2005 |
| JP | 2005-107324 | 4/2005 |
| JP | 2005-110031 | 4/2005 |
| JP | 2005-221383 | 8/2005 |
| JP | 2005-291931 | 10/2005 |
| JP | 2005-291932 | 10/2005 |
| JP | 2005-291933 | 10/2005 |
| JP | 2005-291934 | 10/2005 |
| JP | 2005-291935 | 10/2005 |
| JP | 2005-291936 | 10/2005 |
| JP | 2005-300896 | 10/2005 |
| WO | 2005095892 A1 | 10/2005 |

* cited by examiner

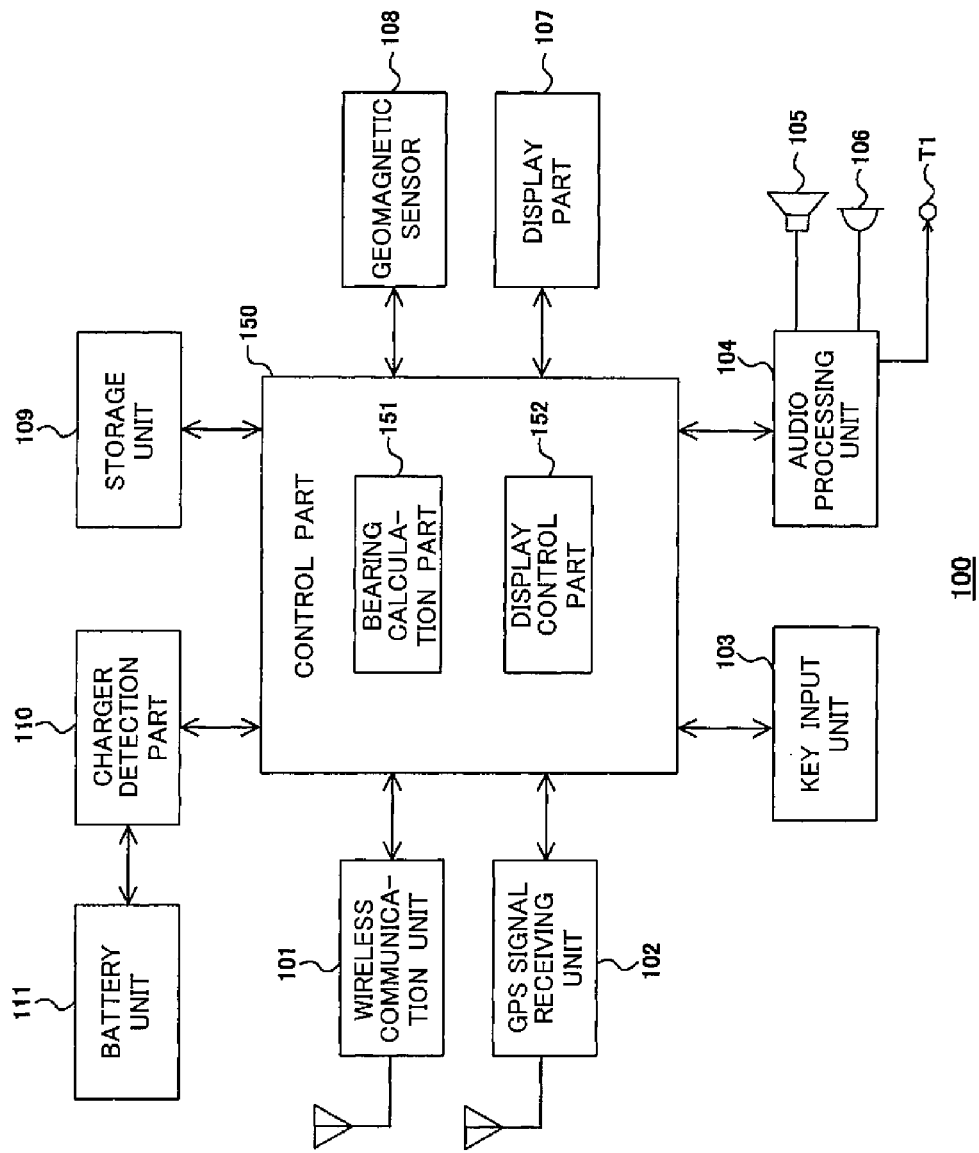

ATTACHED STATE

DETACHED STATE

FIG. 3
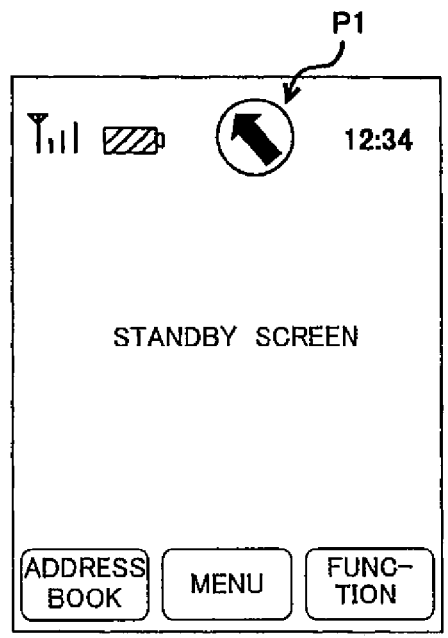
BEARING DATA CHANGES
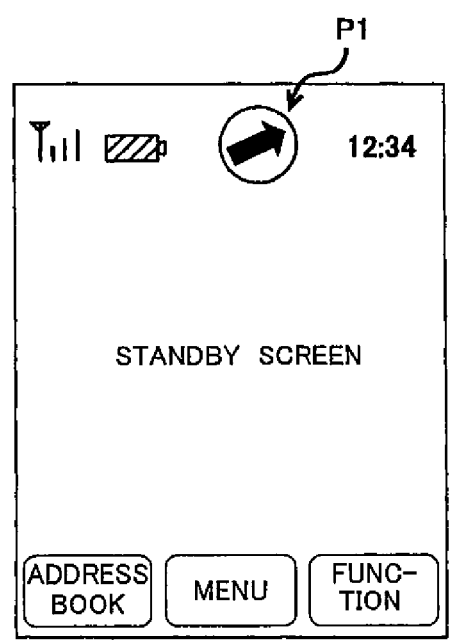

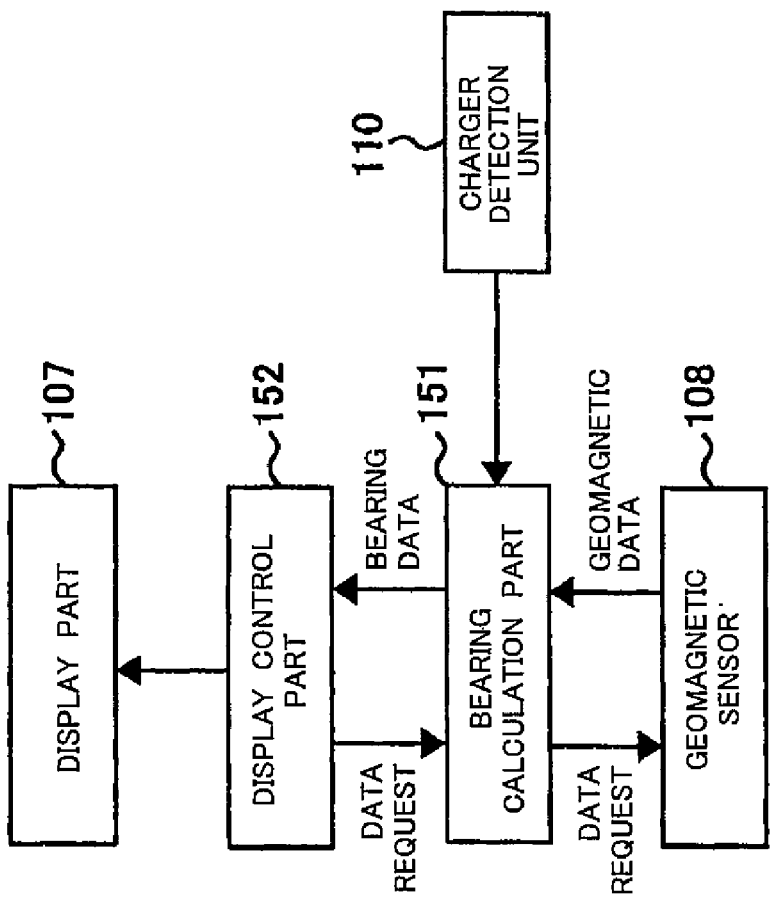
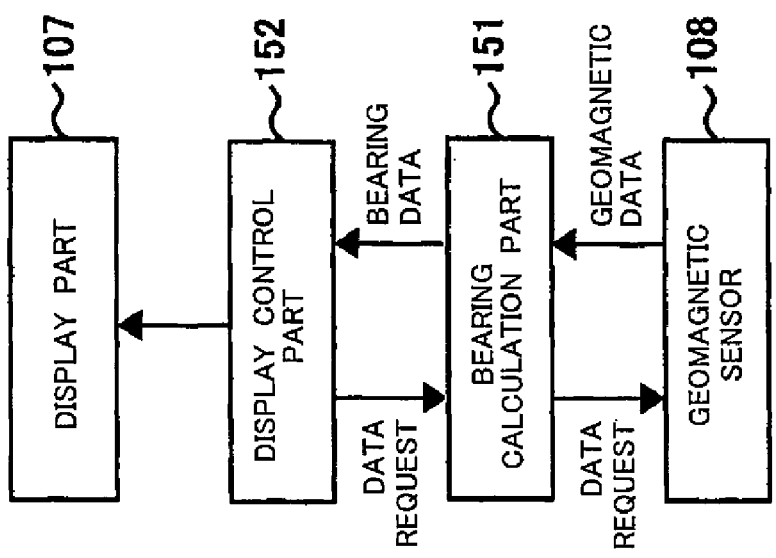

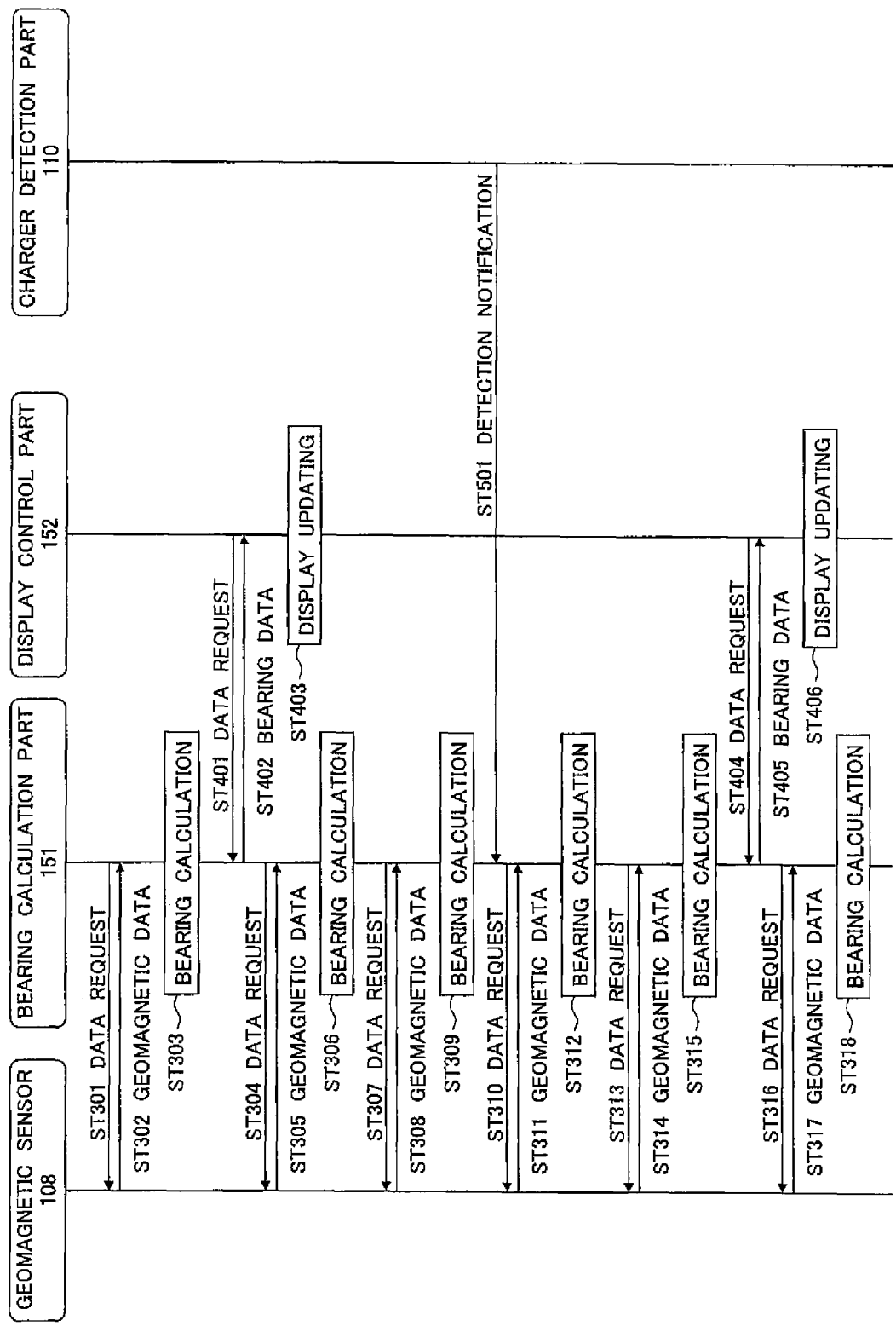

MOBILE ELECTRONIC APPARATUS AND BEARING DISPLAY METHOD OF SAME

CROSS-REFERENCE TO RELATED APPLICATIONS

This application is a national stage of International Application No. PCT/JP2007/051500, filed on Jan. 30, 2007, and claims the benefit of priority under 35 USC 119 of Japanese Patent Application No. 2006-021572, filed on Jan. 30, 2006.

TECHNICAL FIELD

The present invention relates to a mobile electronic apparatus mounting a geomagnetic sensor and capable of displaying a bearing (compass direction, or azimuth) calculated based on the detection result and a bearing display method of the same.

BACKGROUND ART

In recent years, the functions of mobile electronic apparatus typically, such as, mobile phones have been being made increasingly improved. For example, as described in the following Patent Documents, mobile electronic apparatus capable of calculating bearings based on geomagnetism detected by a geomagnetic sensor are known:
Patent Document 1: Japanese Patent Publication (A) No. 2003-289366
Patent Document 2: Japanese Patent Publication (A) No. 2005-110031
Patent Document 3: Japanese Patent Publication (A) No. 2005-107324
Patent Document 4: Japanese Patent Publication (A) No. 2005-107323
Patent Document 5: Japanese Patent Publication (A) No. 2005-300896
Patent Document 6: Japanese Patent Publication (A) No. 2005-291936
Patent Document 7: Japanese Patent Publication (A) No. 2005-291935
Patent Document 8: Japanese Patent Publication (A) No. 2005-291934
Patent Document 9: Japanese Patent Publication (A) No. 2005-291933
Patent Document 10: Japanese Patent Publication (A) No. 2005-291932
Patent Document 11: Japanese Patent Publication (A) No. 2005-291931

DISCLOSURE OF THE INVENTION

Problem to be Solved by the Invention

On the other hand, the situations where mobile phones are used have become increasingly diversified year by year, and there may be cases where displays of bearings are carried out in a variety of situations.

However, depending on the situation, there may be cases where the reliability is low, and thus, sometimes, a bearing different from a true bearing may be displayed. In this case, it suffers from the disadvantage that a user will erroneously recognize that the bearing is correct, irrespective of the fact that a bearing having a low reliability is displayed.

Accordingly, it has been desired to provide a mobile electronic apparatus capable of effectively preventing erroneous recognition by a user, as a correct display of the bearing when the reliability of the display of the bearing is lowered, and a bearing display method for the same.

Means for Solving the Problem

A mobile electronic apparatus according to a first aspect of the present invention is provided with a display part displaying information; a geomagnetic sensor detecting geomagnetism; and a control part configured to calculate a bearing based on geomagnetism detected by the geomagnetic sensor and to display the information of the calculated bearing on the display part, wherein, when an external device generating a magnetic field is connected to the electronic apparatus in a state where the information of the bearing is displayed on the display part, the control part displays that the information of the bearing is incorrect on the display part, or the control part stops the display of the information of the bearing.

Preferably, the mobile electronic apparatus according to the first aspect is provided with a detection part detecting a connection of the external device, and the control part judges whether or not the external device is connected to the electronic apparatus based on the detection result of the detection part.

Further, preferably, the control part repeats the calculation of the bearing, updates the information of the bearing displaying on the display part in accordance with the calculated bearing, and stops the updating of information of the bearing when the detection part detects the connection.

In this case, when the control part stops the updating of the information of the bearing displayed on the display part, the control part may display the information of the bearing based on the geomagnetism detected by the geomagnetic sensor, before the detection part detects the connection, on the display part. Further, when the detection part detects the connection at the time when the information of the bearing is displayed on the display part, the control part may display information which is not the calculated bearing, but a predetermined bearing, on the display part.

The control part may have a bearing calculation unit configured to periodically acquire the detection result of the geomagnetic sensor, calculate the bearing based on the detection result of the acquired geomagnetism, and output the calculation result as bearing data, and a display control part configured to periodically acquire the bearing data from the bearing calculation unit and control the display of the information of the bearing on the display part in accordance with the acquired bearing data. In this case, the bearing calculation unit may output a fixed bearing data to the display control part when the detection part detects the connection.

The bearing calculation unit may output, a bearing data based on the detection result of the geomagnetic sensor acquired before the detection part detects the connection, as the fixed bearing data. Further, the bearing calculation unit may output the bearing data indicating a predetermined bearing as the fixed bearing data.

A mobile electronic apparatus according to a second aspect of the present invention is provided with a display part displaying information; a geomagnetic sensor detecting geomagnetism; a control part configured to calculate the bearing based on the geomagnetism detected by the geomagnetic sensor and displaying the information of the calculated bearing on the display part; and an audio signal supply unit supplying audio signals to a speaker provided in an external device, wherein, when the external device is connected to the electronic apparatus and the audio signal supply unit starts an output of audio signals in a state where the information of the bearing is displayed on the display part, the control part may display that the information of the bearing is incorrect on the display part, or the control part may stop the display of the information of the bearing.

A mobile electronic apparatus according to a third aspect of the present invention is provided with a display part displaying information; a geomagnetic sensor detecting geomagnetism; a control part configured to calculate the bearing based on the geomagnetism detected by the geomagnetic sensor and to display the information of the calculated bearing on the display part; and a battery, wherein, when an external device is connected to the electronic apparatus and the battery is charged by electric power from the external device in the state where the information of the bearing is displayed on the display part, the control part may display that the information of the bearing is incorrect on the display part, or the control part may stop the display of the information of the bearing.

The second aspect of the present invention relates to a bearing display method by which a mobile electronic apparatus is provided with a display part and a geomagnetic sensor, and displays information of a bearing on the display part. This bearing display method has a first step of calculating the bearing based on the geomagnetism detected by the geomagnetic sensor, and displaying information of the calculated bearing on the display part; a second step of detecting a connection of a predetermined external device generating a magnetic field in the first step; and a third step of displaying that the information of the bearing is incorrect on the display part, or stopping the display of the information of the bearing when the connection is detected according to the second step.

Effect of the Invention

According to the present invention, it is achieved to provide a mobile electronic apparatus enabling a correct recognition of a displaying bearing, as much as possible, and a bearing display method of the same.

BRIEF DESCRIPTION OF THE DRAWINGS

FIG. 1 A diagram showing an example of the configuration of a mobile phone or other mobile electronic apparatus according to an embodiment of the present invention.

FIG. 3 A diagram showing an example of display of a bearing at a standby time.

FIG. 4 Diagrams for explaining an operation concerned with calculation and display of a bearing.

FIG. 5 A flow chart showing an example of the operation concerned with the calculation and display of the bearing.

DESCRIPTION OF NOTATIONS

Figure 2A:
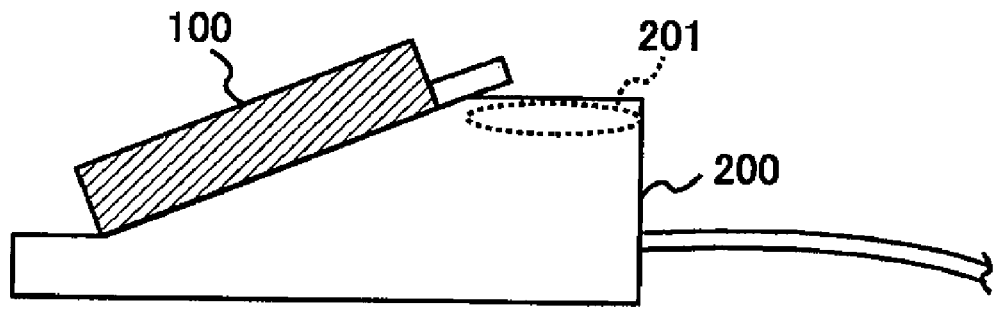
FIG. 2 Diagrams showing an example of a charger equipped with a speaker charging a battery unit.

101 . . . wireless communication unit, 102 . . . GPS signal receiving unit, 103 . . . key input unit, 104 . . . audio processing unit, 105, 201 . . . speakers, 106 . . . microphone, 107 . . . display part, 108 . . . geomagnetic sensor, 109 . . . storage unit, 110 . . . charger detection part, 111 . . . battery unit, 150 . . . control part, and 200 . . . charger.

BEST MODE FOR CARRYING OUT THE INVENTION

FIG. 1 is a diagram showing an example of the configuration of a mobile phone or other mobile electronic apparatus 100 according to an embodiment of the present invention.

The mobile electronic apparatus 100 shown in FIG. 1 has a wireless communication unit 101, a GPS signal receiving unit 102, a key input unit 103, an audio processing unit 104, a speaker 105, a microphone 106, a display part 107, a geomagnetic sensor 108, a storage unit 109, a charger detection part 110, a battery unit 111, and a control part 150.

The wireless communication unit 101 performs wireless communication with a not shown base station connected to a communication network. For example, the communication unit 101 applies predetermined modulation processing to transmission data supplied from the control part 150 to convert the modulated signal to a wireless signal and transmits the converted signal from an antenna. Further, the communication unit applies predetermined demodulation processing to a wireless signal from the base station received at the antenna to convert the received signal to a reception data and outputs the converted signal to the control part 150.

The GPS signal receiving unit 102 receives GPS signals transmitted from three or more GPS satellites circling in known orbits and applies amplification, noise elimination, modulation, or other signal processing to the received signals to obtain information required for calculating a geographical location of the mobile phone 100.

The key input unit 103 has keys assigned with various functions, for example, a power key, speech key, number keys, character keys, direction keys, and an execute key. When these keys are operated by a user, these keys generate signals corresponding to operation contents, and these signals are input, to the control part 150, as an instruction of the user.

The audio processing unit 104 processes an audio signal output from the speaker 105 and an audio signal input from the microphone 106. Namely, the audio processing unit applies amplification, analog-to-digital conversion, coding, or other signal processing to the audio signal input from the microphone 106, converts the audio signal to a digital audio data, and outputs the converted signal to the control part 150. Further, the audio processing unit applies decoding, digital-to-analog conversion, amplification, or other signal processing to the audio data supplied from the control part 150, converts the audio signal to an analog audio signal, and outputs the converted audio signal to the speaker 105.

Further, the audio processing unit 104 supplies an audio signal via a terminal T1 to the charger 200 (see FIG. 2) on which the speaker 201 is mounted.

The display part 107 is configured by using, for example, a liquid crystal display panel, an organic EL panel, or other display device, and displays an image in accordance with a video signal supplied from the control part 150. For example, the display part displays a phone number of a destination at the time of making a call, a phone number of the other party at the time of receiving a call, contents of received mail and sent mail, the date, time, remaining power in the battery, standby screen, and other various information.

Further, in a case where navigation is carried out by a GPS function, a case where the standby screen is displayed, and other cases, the display part 107 displays information of a bearing (azimuth or compass direction) based on the detection result of the geomagnetic sensor 108 (see FIG. 3).

The geomagnetic sensor 108 detects the geomagnetism used for calculating the bearing.

For example, the geomagnetic sensor 108 detects the geomagnetism in each axial direction (of 2 axes or 3 axes) on the basis of a predetermined coordinate system set on a circuit board in a housing (cabinet) of the mobile electronic apparatus 100. For the detection of geomagnetism, there can be used various methods such as a method of utilizing excitation of a coil, a method of utilizing the Hall effect, and a method of utilizing a magnetic resistance element.

The storage unit 109 stores various types of data utilized for the processing in the control part 150. For example, the storage unit stores programs of a computer provided in the control part 150, an address book managing personal information, for example, phone numbers of the other parties and e-mail addresses, an audio file for reproducing a sound of an arrival signal and an alarm sound, an image file for the standby screen, various types of setting data, temporary data utilized in the processing step of the program, and so on.

The storage unit 109 is configured by for example a non-volatile memory device (nonvolatile semiconductor memory, hard disc device, optical disc device, etc.) or a random accessible memory device (for example SRAM or DRAM).

The battery unit 111 includes, for example, a lithium ion battery, a nickel hydrogen battery, or other secondary battery, and supplies a power supply voltage generated in the battery to the respective units of the device.

On the other hand, the mobile electronic apparatus 100 has a function as a music player as well, by reading out music information stored in the storage unit 109 under the control of the control part 150, processing this information at the audio processing unit 104, and outputting the processed signal by the speaker 105. Further, the functions of the mounted music players are being improved year by year, and audio reproduction of higher sound quality has been required, however, the mobile electronic apparatus 100 is limited in the size of the housing, and thus cannot mount a large sized speaker, as a result, it suffers from the disadvantage that a low range of sound cannot be reproduced well. Then, recently, a charger mounting a speaker has been developed. Due to this, a high quality audio can be reproduced by a large sized speaker mounted on the charger while charging the battery of the mobile electronic apparatus 100 by the charger.

Figure 2B:
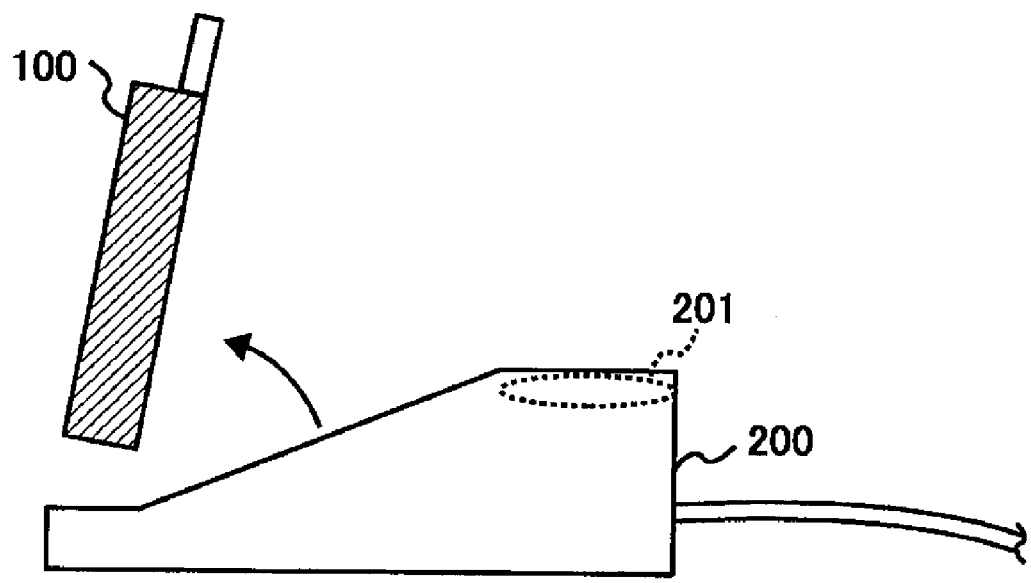

FIG. 2 is a diagram showing an example of the charger 200 equipped with a speaker charging the battery unit 111, and shows a state where the mobile electronic apparatus 100 is attached to the charger 200 (FIG. 2A) and a state where the device 100 is detached (FIG. 2B).

A secondary battery of the battery unit 111 is, for example, as shown in FIG. 2A, charged in a state where the mobile electronic apparatus 100 is attached to the charger 200. Namely, a not shown charging terminal provided in the mobile electronic apparatus 100 and a not shown external terminal provided in the charger 200 are made to contact against each other, and a charge current flows from the charger 200 to the battery 111 via these terminals.

At this time, the terminal T1 of the mobile electronic apparatus 100 and a not shown input terminal of the charger 200 are electrically connected, therefore it becomes possible to supply an audio signal from the audio processing unit 104 to a speaker 201 of the charger 200. However, there may appear an error in the detected value of the geomagnetic sensor 108, due to a magnetic field generated by the speaker 201.

The charger detection part 110 detects whether or not the mobile electronic apparatus 100 is attached to the charger 200. For example, the detection part detects a supply of electric power from the charger 200 to the battery unit 111, and an electric connection or physical contact, between the mobile electronic apparatus 100 and the battery unit 111.

For example, the charger detection part 110 detects a current supplied from the charger 200 to the battery unit 111. When this current is a predetermined value or higher than that, the detection part may detect as the mobile electronic apparatus 100 is attached to the charger 200.

Further, a sensor for sensing contact may be provided in a portion where the mobile electronic apparatus 100 and the charger 200 contact in a state where the mobile electronic apparatus 100 is attached to the charger 200 (FIG. 2A), and it may detect whether or not the mobile electronic apparatus 100 is attached to the charger 200 in accordance with the output of the sensor. Further, for example, a switch turned on/off according to the contact may be provided in the charger 200, and the charger detection part 110 may detect attachment or detachment in accordance with the on/off state of this switch.

Further, as another example, two electrodes for detecting the contact may be provided in the mobile electronic apparatus 100, and a short-circuiting electrode may be provided in the charger 200 wherein the short-circuiting electrode makes the short-circuit between these two electrodes in the state where the mobile electronic apparatus 100 is attached to the charger 200. In this case, the charger detection part 110 can detect the attachment/detachment state of the charger by detecting whether or not the two electrodes provided in the mobile electronic apparatus 100 are short-circuited.

Referring back to the explanation of FIG. 1.

The control part 150 centrally controls the overall operation of the mobile electronic apparatus 100.

Namely, the control part controls the operations of the respective units explained above (transmission/reception of signals at the wireless communication unit 101, reception of GPS signals at the GPS signal receiving unit 102, input/output of audio at the audio processing unit 104, acquisition of geomagnetic data from the geomagnetic sensor 108, display of images on the display part 107, and so on), so that various types of processing of the mobile electronic apparatus 100 (audio speech performed via a line switching network, preparation and transmission/reception of e-mails, inspection of web site of the Internet, navigation utilizing map, and so on) are executed in a suitable sequence in accordance with the operation of the key input unit 103.

For example, the control part 150 is provided with a computer executing processing based on programs (operating system, application, etc.) stored in the storage unit 109 and executes the processing explained above according to a sequence indicated by the programs. Namely, the computer sequentially reads command codes from the operating system, application program, or other program stored in the storage unit 109 and executes the processing.

When the instruction indicating a start of the navigation is input to the key input unit 103, the control part 150 determines a geographical location of the present spot (a current position) based on the GPS signals and displays this on the display part 107 as a map.

For example, the control part 150 receives GPS signals by the GPS signal receiving unit 102 and transmits information thereof by the wireless communication unit 101 to a server apparatus on the communication network. The server apparatus calculates the geographical location (for example, latitude and longitude) of the mobile electronic apparatus 100 based on this information of GPS signals, and transmits the information concerning the location of the calculation result and information of the map around the location through the communication network to the mobile electronic apparatus 100. Based on these information sent from the server apparatus, the control part 150 displays an image of a map representing the geographical location of the present spot on the display part 107.

The control part 150 displays the information of the bearing on the display part 107 in a case where the navigation processing as described above is carried out, a case where a usual standby screen is displayed, and so on. Namely, the control part acquires the data of the geomagnetism detected by the geomagnetic sensor 108, calculates the bearing based on this acquired data, and displays this acquired data as the information of the bearing on the display part 107. The control part 150 calculates the bearing in, for example, a constant cycle and periodically updates the information of the bearing displayed on the display part 107 in accordance with the calculation result.

The information of the bearing is, for example, as shown in FIG. 3, displayed on the screen of the display part 107, as an icon simulating a compass.

In the example of FIG. 3, an arrow indicated by an icon P1 of the compass represents a specific bearing (for example, the north). When the result of calculation of the bearing (bearing data) changes in accordance with the change of orientation of the mobile electronic apparatus 100, the orientation of this arrow changes as well in accordance with this.

If the charger detection part 110 detects that the mobile electronic apparatus 100 is attached to the charger 200 equipped with the speaker (FIG. 2) when displaying the information of the bearing as explained above on the display part 107, the control part 150 displays that the information of the present bearing is incorrect on the display part 107.

For example, when the charger detection part 110 detects the attachment of the electric device 100 to the charger 200, the control part 150 stops the calculation of the bearing which has been periodically repeated hitherto and stops the updating of the information of the bearing displayed on the display part 107.

In this case, the control part 150 displays, on the display part 107, the information of the bearing based on the geomagnetism detected by the geomagnetic sensor 108 before, for example, when the attachment of the electric device 100 to the charger 200 is detected at the charger detection part 110. Further, as another example, information of a certain specific bearing (for example, information indicating that an upward bearing of the screen is the "north" bearing) may be displayed on the display part 107 in place of the bearing calculated based on the detection result of the geomagnetic sensor 108.

In any case, the information of the bearing displayed on the display part 107 no longer changes, therefore the user can be made to correctly recognize that the calculation of the bearing is stopped (that is, the information of the displayed bearing is incorrect).

The control part 150 has a bearing calculation unit 151 and a display control part 152 as components concerned with the calculation and display of the bearing.

The bearing calculation unit 151 periodically acquires the detection result of the geomagnetic sensor 108, and calculates the bearing based on this detection result. Then, the bearing calculation unit outputs the calculation result as the bearing data to the display control part 152. Note, where the charger 200 is detected at the charger detection part 110, a fixed bearing data irrelevant to the geomagnetic data is output to the display control part 152. As this fixed bearing data, for example, bearing data based on the detection result of the geomagnetic sensor 108 before the charger 200 is detected at the charger detection part 110, or bearing data indicating a specific bearing irrelevant to the geomagnetic data is output.

The display control part 152 periodically acquires the bearing data from the bearing calculation unit 151, and performs control so that the information of the bearing in accordance with the acquired data is displayed on the display part 107.

Here, an explanation will be given of the operation concerned with the calculation and display of the bearing in the mobile electronic apparatus 100 according to the present embodiment having the configuration explained above with reference to FIG. 4 and FIG. 5.

FIG. 4 are diagrams for explaining the operation concerned with the calculation and display of the bearing.

FIG. 4A shows the operation in a case where the mobile electronic apparatus 100 is detached from the charger 200.

In this case, the bearing calculation unit 151 requests the data to the geomagnetic sensor 108 in a predetermined cycle (for example, about several hundreds msec). The geomagnetic sensor 108 answers this request and outputs the detection result of geomagnetism as the geomagnetic data to the bearing calculation unit 151. The bearing calculation unit 151 periodically calculates the bearing based on the geomagnetic data acquired from the geomagnetic sensor 108.

Further, the display control part 152 requests the data to the bearing calculation unit 151 in a cycle longer than that for the bearing calculation unit 151 (for example, about 1 second). The bearing calculation unit 151 outputs the calculation result of the bearing as the bearing data to the display control part 152 in response to this request. The display control part 152 periodically updates the information of the bearing displayed on the display part 107 based on the bearing data acquired from the bearing calculation unit 151.

FIG. 4B shows the operation in a case where the mobile electronic apparatus 100 is attached to the charger 200.

When the charger detection part 110 detects the charger 200, the bearing calculation unit 151 outputs a fixed pseudo bearing data (pseudo data) to the display control part 152 in place of the bearing data calculated based on the geomagnetic data in response to a data request of the display control part 152. The display control part 152 acquires the bearing data from the bearing calculation unit 151 in a constant cycle, but that bearing data becomes a fixed pseudo data irrelevant to the geomagnetic data. For this reason, information of the bearing displayed on the display control part 152 becomes constant, and the information is no longer updated.

The bearing calculation unit 151, as the fixed bearing data described above, outputs the bearing data indicating, for example, a specific bearing to the display control part 152. Due to this, on the display part 107, the information of the bearing is displayed so that the fixed bearing of the screen faces the specific bearing (for example, the upward bearing of the screen faces the "north").

Further, as another example, the display control part 152 outputs the bearing data based on the geomagnetic data acquired from the geomagnetic sensor 108 before the charger detection part 110 detects the attachment of the electric device 100 to the charger 200 (for example, a cycle immediately before the detection) to the display control part 152 as the fixed bearing data explained above. Due to this, on the display part 107, the information of the bearing immediately before the mobile electronic apparatus 100 is attached to the charger 200 is continuously being displayed even after the attachment.

Then, when the charger detection part 110 detects that the connection of the charger 200 and the electric device 100 is released, the bearing calculation unit 151 acquires the value of the geomagnetic sensor 108 again when the next data request cycle comes, and performs the bearing data output to the display control part 152. Namely, the processing of FIG. 4A is restarted.

FIG. 5 is a flow chart showing an example of the operation concerned with the calculation and display of the bearing.

The bearing calculation unit 151 requests the geomagnetic data to the geomagnetic sensor 108 during the predetermined cycle (steps ST301, ST304, ST307, ST310, ST313, and ST316). The geomagnetic sensor 108, in response to this request, periodically outputs the geomagnetic data to the bearing calculation unit 151 (steps ST302, ST305, ST308, ST311, ST314, and ST317). The bearing calculation unit 151, based on the geomagnetic data acquired from the geomagnetic sensor 108, periodically calculates the bearing (steps ST303, ST306, ST309, ST312, ST315, and ST318).

The display control part 152 requests the bearing data to the bearing calculation unit 151 in a cycle longer than the calculation cycle of the bearing (steps ST401 and ST404).

When the display control part 152 requests the bearing data at step ST401, the charger detection part 110 has not detected the charger 200. For this reason, the bearing calculation unit 151 outputs the bearing data calculated at step ST303 to the display control part 152 (step ST402), and the display control part 152 updates the information of the bearing displayed on the display part 107 in accordance with this bearing data (step ST403). In this case, the information of the bearing displayed on the display part 107 becomes information representing an actual bearing based on the detection result of the geomagnetic sensor 108.

On the other hand, when the display control part 152 requests the bearing data at step ST402, the charger detection part 110 has detected the attachment of the electric device 100 to the charger 200 (step ST501). For this reason, the bearing calculation unit 151 outputs the fixed pseudo data irrelevant to the geomagnetic data to the display control part 152 (step ST405), and the display control part 152 updates the information of the bearing displayed on the display part 107 in accordance with this pseudo data (step ST406). Hereinafter, during a period where the charger detection part 110 is detecting the charger 200, the information of the fixed bearing in accordance with the pseudo data is displayed on the display part 107.

This pseudo data may be a bearing data indicating a specific bearing as previously explained as well, or may be a bearing data based on the geomagnetic data acquired from the geomagnetic sensor 108 before the charger detection part 110 detects the attachment of the electric device 100 to the charger 200. In the latter case, in the example of FIG. 5, the bearing data calculated at step ST309 is output as the pseudo data to the display control part 152 at step ST405.

As explained above, according to the present embodiment, when the information of the bearing calculated based on the geomagnetism detected at the geomagnetic sensor 108 is displayed on the display part 107, if the mobile electronic apparatus 100 is attached to the charger 200 provided with the speaker 201, the updating of the information of the bearing which has been repeated hitherto is stopped, and the information of the constant bearing is continuously displayed on the display part 107.

Due to this, it becomes possible to make the user correctly recognize that the information of the bearing displayed on the display part 107 is incorrect, so it is possible to effectively prevent the user being misled by the information of the display part 107 lacking in reliability.

Further, in the present embodiment, the control part 150 is provided with the bearing calculation unit 151 and the display control part 152. The bearing calculation unit 151 periodically acquires the detection result of the geomagnetic sensor 108, calculates the bearing based on this detection result, and outputs this calculation result as the bearing data. Further, the display control part 152 periodically acquires the bearing data output from the bearing calculation unit 151 and controls the display of the information of the bearing on the display part 107 in accordance with this acquired bearing data. Then, when the attachment of the electric device 100 to the charger 200 is detected by the charger detection part 110, the bearing data output from the bearing calculation unit 151 to the display control part 152 is fixed to the constant pseudo data.

Due to this, an inconvenience that, when the mobile electronic apparatus 100 is connected to the charger 200, an error occurs in the detection value of the geomagnetism due to the influence of magnetism of the charging current and the speaker, a bearing different from the original bearing is displayed, and a bearing having a low reliability is displayed can be avoided, but this is not clearly shown to the user, therefore the user may erroneously recognize that the bearing is correct.

And, by only controlling the bearing data output from the bearing calculation unit 151 in accordance with the detection result of the charger detection part 110, the display part 107 can be made to display the information of any bearing without making the display control part 152 execute special processing, therefore the configuration of the control part 150 can be simplified. Further, it is not necessary to change the configuration of the display control part 152 in order to realize the operation described above, therefore the design can be simplified.

Note that, the embodiment explained above is an example, and the present invention is not limited to only the above embodiment.

In the above embodiment, the example where the mobile electronic apparatus 100 was connected to the charger 200 was shown, but the present invention is not limited to this. The present invention can be applied to most situations where the mobile electronic apparatus is connected to an external device that generates a magnetic field.

For example, in the above embodiment, the case where the mobile electronic apparatus 100 was attached to a speaker mounted on the charger was mentioned as the example, but the present invention is not limited to this embodiment. The present invention can also be applied to a case where a mobile electronic apparatus is attached and used in an external device generating a magnetic field that may cause detection error of the geomagnetic sensor, for example, an external speaker device not having a charging function, an external display device, and an external memory device.

Further, so far as an interface connector linked with the control part is provided, various types of external devices may be connected via this interface connector. Even in a case where the charger is a type that is connected by the interface connector, it is possible to perform the control as in the present invention so far as a usage state of this connector can be detected at the detection part.

Further, it can be judged whether the connection is made by the charger 200 or by a charger of type connected via the interface connector by confirmation of the usage situation of the interface connector by the control part 150 in addition to the detection result of the charger, Further, the control method may be changed as well between the case where the mobile electronic apparatus is attached to the charger 200 and the case where the charger is connected via the interface connector. For example, in the case where the mobile electronic apparatus is attached to the charger 200, since almost no situation where the bearing must be determined while carrying this charger 200 can be imagined, the information of the bearing need not be displayed either. Further, in a case where the charger is connected via the interface connector, there may exist a case where, for example, the mobile electronic apparatus is connected to a vehicle-mounted charger outdoors and the navigation is carried out as well, therefore the information of the bearing may be displayed while fixing the orientation to the north (north up display) as well.

Further, when the charger is connected via such an interface connector, there is a possibility that the geomagnetic sensor will be influenced by a charging current thereof and an error will arise in the accuracy of the bearing. At this time, for the user, it may be displayed on the display part 107 that there is a possibility of a drop in the reliability of the bearing and the display of the bearing may be fixed to a constant bearing. Alternatively, even if the reliability of the bearing is low, where there is an instruction of the user from the key input unit 103, the bearing based on the detected value of the geomagnetic sensor may be displayed.

Further, the above embodiment shows that the bearing is incorrect by stopping the updating of the information of the bearing displayed on the display part 107 when the mobile electronic apparatus is attached to a predetermined external device generating a magnetic field, but the present invention is not limited to this embodiment.

For example, the display of the information of the bearing may be stopped by a method of erasing an image representing the bearing from the screen of the display part 107. Due to this, erroneous recognition of the user that the information of the bearing is correct irrespective of the fact that the information of the bearing is incorrect can be reliably prevented.

Further, the user may be made to recognize that the displayed bearing is incorrect by making the image representing the bearing blink or by changing the shape, color, brightness, size, or the like of the image.

Further, it is also possible to make the user recognize that the displayed bearing is incorrect by letters (characters), a symbol, or other message.

In the above embodiment, it is displayed on the display part that the information of the bearing is incorrect in the case where the mobile electronic apparatus is attached to an external device equipped with the speaker, but the present invention is not limited to this embodiment. For example, there may be a case where a magnetic field dynamically changing in accordance with a drive current of the speaker is easier to become detection error of the geomagnetic sensor than a static magnetic field generated by a permanent magnet of the speaker. In such case, it may be displayed on the display part that the information of the bearing is incorrect at the time when the mobile electronic apparatus is attached to the external device, and an audio signal is supplied from the audio signal processing unit (audio signal supply unit) to the speaker of the external device (that is the state where the external device is connected, then the music playback by the music player function is instructed).

In the example of the operation shown in the flow chart of FIG. 5, even after the charger detection part 110 detects the charger 200 at step ST501, the bearing calculation unit 151 periodically calculates the bearing, but the present invention is not limited to this example. During the period where the charger 200 is detected at the charger detection part 110, the bearing calculation unit 151 may stop the acquisition of the geomagnetic data from the geomagnetic sensor 108 and the calculation of the bearing. In other words, when the attachment of the electric device to a predetermined external device generating a magnetic field is detected, the control part may stop the calculation of the bearing based on the detection result of the geomagnetic sensor. By not allowing unnecessary calculation of the bearing, the processing amount of the control part is reduced, and the power consumption can be reduced.

The functions of the components in the above embodiment may be realized by hardware or may be realized by software by using a computer. For example, part or all of the data processing and control in the control part 150, wireless communication unit 101, GPS signal receiving unit 102, and audio processing unit 104 can be realized by computer programs. Further, the bearing calculation unit 151 may be configured as a device driver of the geomagnetic sensor 108, and the display control part 152 may be configured as an application program.

In the above embodiment, a mobile phone was mainly explained as an example of a mobile electronic apparatus, but the present invention is not limited to this example. The present invention can be widely applied to, for example, a portable computer or game machine, an audio player, or various other devices capable of displaying a bearing by using a geomagnetic sensor.

The invention claimed is:

1. A mobile electronic apparatus comprising:
a display part displaying information;
a geomagnetic sensor detecting geomagnetism; and
a control part configured to calculate a bearing based on geomagnetism detected by the geomagnetic sensor and to display the information of the calculated bearing on the display part, wherein,
the electronic apparatus is configured to detect a state where an external device generating a magnetic field is connected to the electronic apparatus in a state where the information of the bearing is displayed on the display part, and
the control part is configured to indicate that the information of the bearing is incorrect on the display part, or configured to stop the display of the information of the bearing, when the state where the external device is connected to the electronic apparatus is detected.

2. A mobile electronic apparatus as set forth in claim 1, wherein
the electronic apparatus comprises a detection part detecting a connection of the external device, and
the control part judges whether or not the external device is connected to the electronic apparatus based on the detection result of the detection part.

3. A mobile electronic apparatus as set forth in claim 2, wherein
the control part repeats the calculation of the bearing, updates the information of the bearing displaying on the display part in accordance with the calculated bearing, and stops the updating of information of the bearing when the detection part detects the connection.

4. A mobile electronic apparatus as set forth in claim 3, wherein,
when the control part stops the updating of the information of the bearing displayed on the display part, the control part displays the information of the bearing based on the geomagnetism detected by the geomagnetic sensor, before the detection part detects the connection, on the display part.

5. A mobile electronic apparatus as set forth in claim 2, wherein,
when the detection part detects the connection at the time when the information of the bearing is displayed on the display part, the control part displays information which is not the calculated bearing, but a predetermined bearing, on the display part.

6. A mobile electronic apparatus as set forth in claim 2, wherein the control part has a bearing calculation unit configured to periodically acquire the detection result of the geomagnetic sensor, calculate the bearing based on the detection result of the acquired geomagnetism, and output the calculation result as bearing data, a display control part configured to periodically acquire the bearing data from the bearing calculation unit and control the display of the information of the bearing on the display part in accordance with the acquired bearing data, and the bearing calculation unit outputs a fixed bearing data to the display control part when the detection part detects the connection.

7. A mobile electronic apparatus as set forth in claim 6, wherein the bearing calculation unit outputs, a bearing data based on the detection result of the geomagnetic sensor acquired before the detection part detects the connection, as the fixed bearing data.

8. A mobile electronic apparatus as set forth in claim 6, wherein the bearing calculation unit outputs the bearing data indicating a predetermined bearing as the fixed bearing data.

9. A mobile electronic apparatus comprising:
a display part displaying information;
a geomagnetic sensor detecting geomagnetism;
a control part configured to calculate the bearing based on the geomagnetism detected by the geomagnetic sensor and to display the information of the calculated bearing on the display part; and
an audio signal supply unit supplying audio signals to a speaker provided in an external device,
wherein, the electronic apparatus is configured to detect a state where the external device is connected to the electronic apparatus and the audio signal supply unit starts an output of audio signals in a state where the information of the bearing is displayed on the display part, and
the control part is configured to indicate that, the information of the bearing is incorrect on the display part, or configured to stop the display of the information of the bearing, when the state where the external device is connected to the electronic apparatus is detected.

10. A mobile electronic apparatus comprising:
a display part displaying information;
a geomagnetic sensor detecting geomagnetism;
a control part configured to calculate the bearing based on the geomagnetism detected by the geomagnetic sensor and to display the information of the calculated bearing on the display part; and
a battery,
wherein, the electronic apparatus is configured to detect a state where an external device is connected to the electronic apparatus and the battery is charged by electric power from the external device in the state where the information of the bearing is displayed on the display part, and
the control part is configured to indicate that the information of the bearing is incorrect on the display part or configured to stop the display of the information of the bearing, when the state where the external device is connected to the electronic apparatus is detected.

11. A method for displaying a bearing by which a mobile electronic apparatus comprises a display part and a geomagnetic sensor, and displays information of a bearing on the display part, the method having
a first step of calculating the bearing based on the geomagnetism detected by the geomagnetic sensor, and displaying information of the calculated bearing on the display part;
a second step of detecting a connection of a predetermined external device generating a magnetic field to the electronic apparatus, in the first step; and
a third step of displaying that the information of the bearing is incorrect on the display part, or stopping the display of the information of the bearing when the connection is detected according to the second step.

* * * * *